US007079380B2

(12) United States Patent
Wubs

(10) Patent No.: US 7,079,380 B2
(45) Date of Patent: Jul. 18, 2006

(54) SHOCK AND VIBRATION ISOLATION SYSTEM

(75) Inventor: Leonard William Wubs, Surrey (CA)

(73) Assignee: Honeywell Silent Witness Inc., Surrey (CA)

( * ) Notice: Subject to any disclaimer, the term of this patent is extended or adjusted under 35 U.S.C. 154(b) by 0 days.

(21) Appl. No.: 10/193,897

(22) Filed: Jul. 15, 2002

(65) Prior Publication Data

US 2003/0210519 A1 Nov. 13, 2003

(51) Int. Cl.
*G06F 1/16* (2006.01)
(52) U.S. Cl. ............... 361/685; 369/75.11; 312/332.1; 312/333
(58) Field of Classification Search ............. 361/683, 361/685, 740–742, 752, 756, 758, 804, 721–722, 361/759, 801, 825, 736, 796; 369/215, 244, 369/247, 263, 75.1, 176, 80, 81, 82; 360/97.01, 360/97.02, 77.01, 77.05, 77.07, 73.08, 77.09, 360/78.18, 97.03, 97.04; 312/332.1, 333; 428/71, 76, 220, 226, 354; 248/634–636, 248/618, 638, 500, 609, 625
See application file for complete search history.

(56) References Cited

U.S. PATENT DOCUMENTS

| | | | | |
|---|---|---|---|---|
| 4,831,476 A | * | 5/1989 | Branc et al. ............. 360/97.02 |
| 4,937,806 A | | 6/1990 | Babson et al. | |
| 5,042,024 A | * | 8/1991 | Kurosawa et al. ......... 369/75.1 |
| 5,379,990 A | | 1/1995 | Ando et al. | |
| 5,463,527 A | | 10/1995 | Hager et al. | |
| 5,595,430 A | * | 1/1997 | Weyeneth ................. 312/319.1 |
| 5,757,753 A | * | 5/1998 | Sugano et al. ............. 369/75.1 |
| 5,867,472 A | * | 2/1999 | Suzuki ....................... 369/263 |
| 5,953,303 A | * | 9/1999 | Sugano et al. ............. 720/651 |
| 6,178,156 B1 | * | 1/2001 | Kuwajima et al. ......... 720/694 |
| 6,219,315 B1 | * | 4/2001 | Buchs et al. ............. 369/44.11 |
| 6,320,744 B1 | * | 11/2001 | Sullivan et al. ............. 361/685 |
| 6,477,042 B1 | * | 11/2002 | Allgeyer et al. ............ 361/685 |
| 2004/0196588 A1 | * | 10/2004 | Jensen ..................... 360/97.02 |

FOREIGN PATENT DOCUMENTS

| | | | | |
|---|---|---|---|---|
| JP | 409293370 A | * | 11/1997 |
| JP | 410011957 A | * | 1/1998 |
| JP | 410055660 A | * | 2/1998 |
| JP | 410188548 A | * | 7/1998 |
| JP | 411045560 A | * | 2/1999 |
| JP | 02000067507 A | * | 3/2000 |

* cited by examiner

*Primary Examiner*—Michael Datskovskiy
(74) *Attorney, Agent, or Firm*—Scully, Scott, Murphy & Presser, P.C.

(57) ABSTRACT

An assembly for isolating a mechanically sensitive electronic component, such as a computer hard drive, from shock and vibration, such as in a mobile vehicle application. The assembly is comprised of springs connected to the component, and a cage surrounding the component to limit its displacement. The springs suspend the component to minimize mechanical coupling from the vibration source to the component. Dampers are affixed to the component in order to dissipate mechanical energy as the dampers come into contact with the cage. The assembly is designed to isolate the component from operating mechanical shocks and vibration in the frequency range associated with a shock or vibration source.

11 Claims, 3 Drawing Sheets

SHOCK AND VIBRATION ISOLATION SYSTEM

FIELD

The present invention is directed toward a shock and vibration isolation system for mechanically sensitive electronic components, such as computer hard drives. In particular, the present invention is designed to isolate components from the mechanical shock and vibration present in a mobile vehicle environment, such as encountered on transport trucks and buses of all sorts.

BACKGROUND

The physical damage thresholds of various mechanically sensitive electronic components, such as computer hard drives, are extremely low. Prior art suspension systems have attempted to address the need for vibration isolation in a mobile environment by using either a damper-mass or spring-mass based isolation system. However, damper-mass based isolation systems have significant mechanical coupling of vibrations above the system fundamental resonant frequency, resulting in poor high frequency vibration attenuation. Furthermore, spring-mass based systems do not limit or dampen vibrations at or near the fundamental system resonant frequency. The resulting amplitude of the mechanical displacement of spring-mass based systems can become very large at the system's major resonant frequency as a result of this resonant amplification.

The ratio of input vibration compared to the measured vibration of the isolated component is referred to as the systems transmissibility function. The system's transmissibility function, including the resonant amplification and the overall performance of a vibration isolation system can be evaluated by a swept sine wave stimulus function vibration source. Peak transmissibilities for a spring-mass based vibration isolation system can often exceed values of 20, and transmissibility factors of 200 or more have been measured. As such, neither damper-mass nor spring-mass based vibration isolation systems are suitable for general mobile vehicle applications.

There is a need for a vibration isolation system, which adequately protects these sensitive devices in a mobile vehicle environment. It is an object of the present invention to provide an inexpensive, simple, and durable shock and vibration isolation system for mechanically sensitive electronic components that is capable of performing well in a mobile vehicle environment. It is a further object of the present invention to provide a shock and vibration isolation system which enables the mechanically sensitive electronic components to be shipped, stored or mounted in any orientation.

SUMMARY OF THE INVENTION

The present invention provides an isolation assembly, which prevents mechanical vibrations emanating from the vehicle engine, as well as shock and vibrations from the road surface, from damaging mechanically sensitive electronic components, such as a computer hard drive. The isolation assembly comprises:
1) A highly under dampened mass support system to minimize mechanical coupling from the vibrating system source to the stationary (isolated) system;
2) A mechanically restraining cage to limit excessive isolated mass displacement; and
3) A highly energy absorbent material to progressively dissipate the mechanical energy of the isolated mass system when excessive mechanical displacement occurs.

Additionally, the present invention may provide full mechanical vibration isolation when the product is positioned in any of six possible major orientations.

BRIEF DESCRIPTION OF THE DRAWINGS

Further features and advantages of the invention will be apparent from the following detailed description, given by way of example, of a preferred embodiment taken in conjunction with the accompanying drawings, wherein.

DETAILED DESCRIPTION OF THE INVENTION

Figure 1:
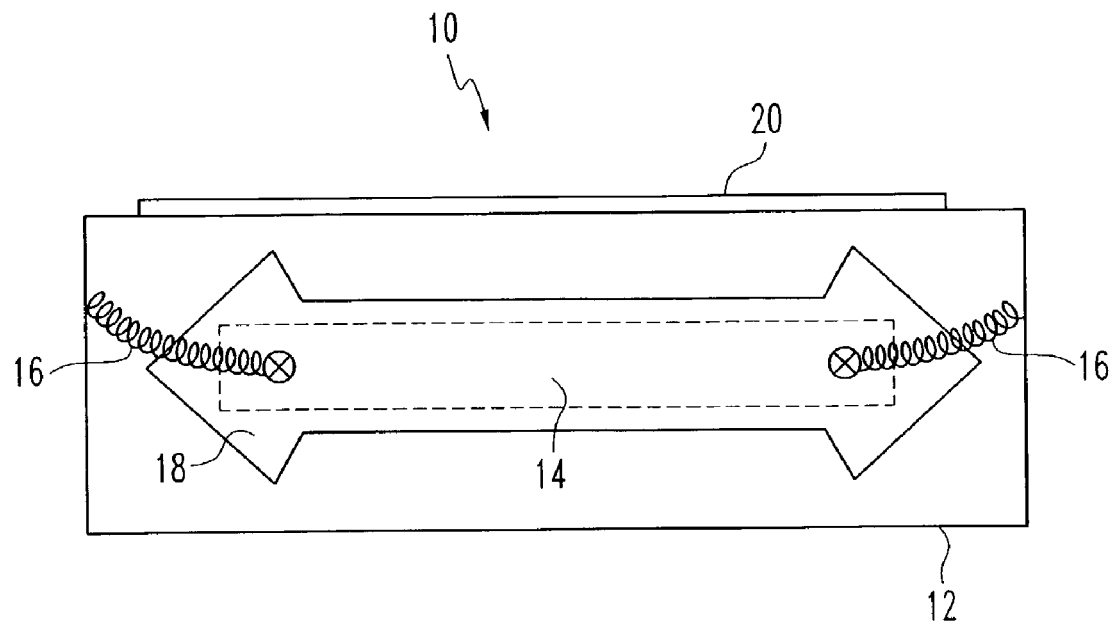
FIG. 1 is a side view of the shock and vibration isolation assembly with the dampers affixed to the object.

Referring to FIG. 1, the isolation assembly 10 is comprised of a computer hard drive 14 suspended on four springs 16 having a very low spring rate. The very low spring rate of the four springs 16 in combination with the mass of the computer hard drive 14 forms a mechanically low frequency resonant system. The springs 16 are selected to set the resonant frequency for the isolation assembly 10 to a low spectral energy location.

The computer hard drive 14 is suspended in a cage assembly consisting of a base frame 12 and an upper lid 20, to limit displacement, thereby preventing excessive mechanical travel of the computer hard drive 14. Triple-axis energy dampers 18 made of a highly energy absorbing material, such as a cellular urethane, are affixed to the computer hard drive 14 to dissipate kinetic energy transferred as the computer hard drive 14 approaches the maximum displacement. The dampers must not be in contact with the upper lid 20 of the cage assembly or base frame 12 in the presence of low amplitude vibration. The dampers 18 provide progressive deceleration to the computer hard drive 14 to limit the maximum vibration and shock amplitude and consequential damage to the computer hard drive 14. The dampers 18 serve to dissipate energy from the system at the fundamental system resonant frequency in the presence of sustained vibration. The dampers 18 will function primarily at or near the system's resonant frequency and immediately after individual mechanical shock pulses. The dampers 18 are important, as the constraining cage assembly and springs 16, in the absence of the dampers 18 would cause high shock and vibration amplitude to occur when the system is near resonance.

Figure 3:
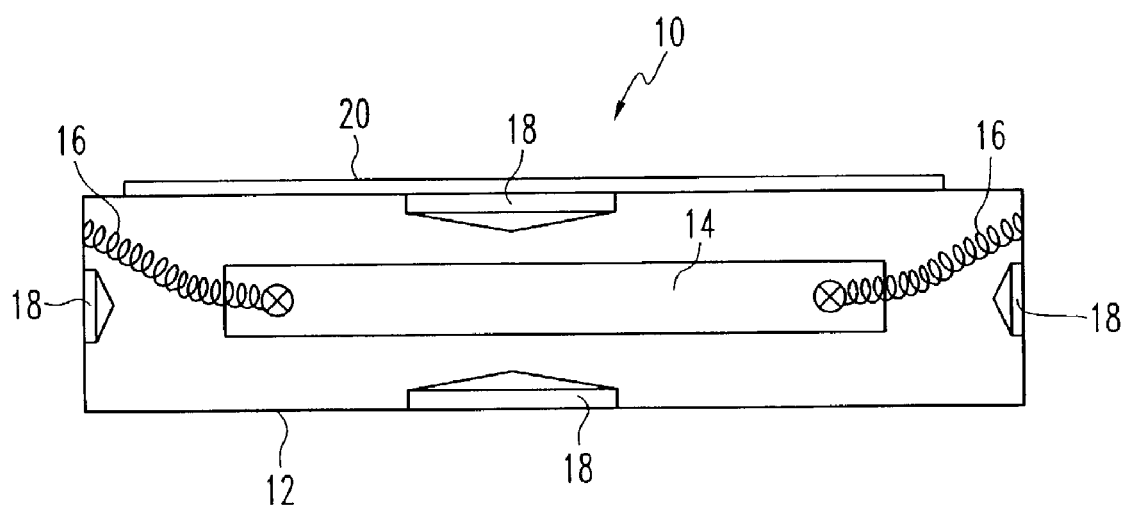
FIG. 3 is a side view of the shock and vibration isolation assembly with the dampers affixed to the cage assembly.
Figure 2:
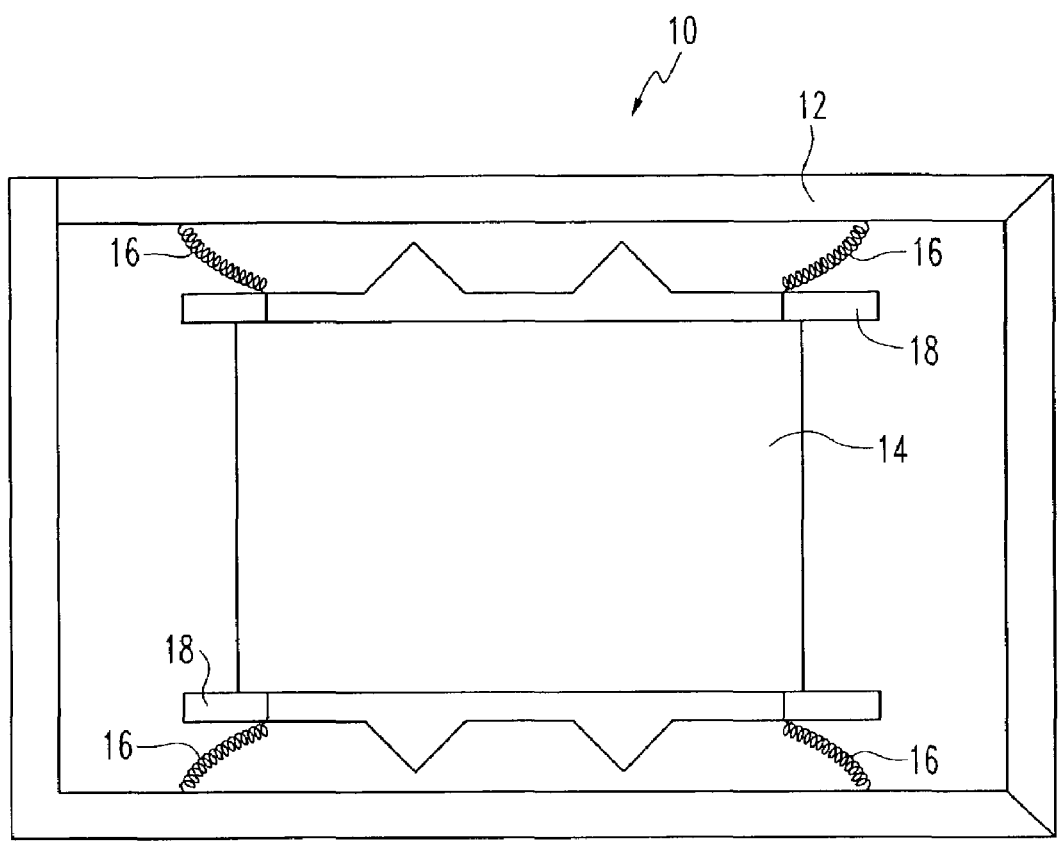
FIG. 2 is a top view of the shock and vibration isolation assembly of FIG. 1 without a lid.

In an alternative embodiment of the isolation assembly 10 as shown in FIG. 3, the dampers 18 are affixed to the upper lid 20 and to each of the walls of the base frame 12 (two of the dampers 18 are located on the walls of the base frame 12 which are not shown). The remainder of the isolation assembly 10 is constructed as described above.

Figure 4:
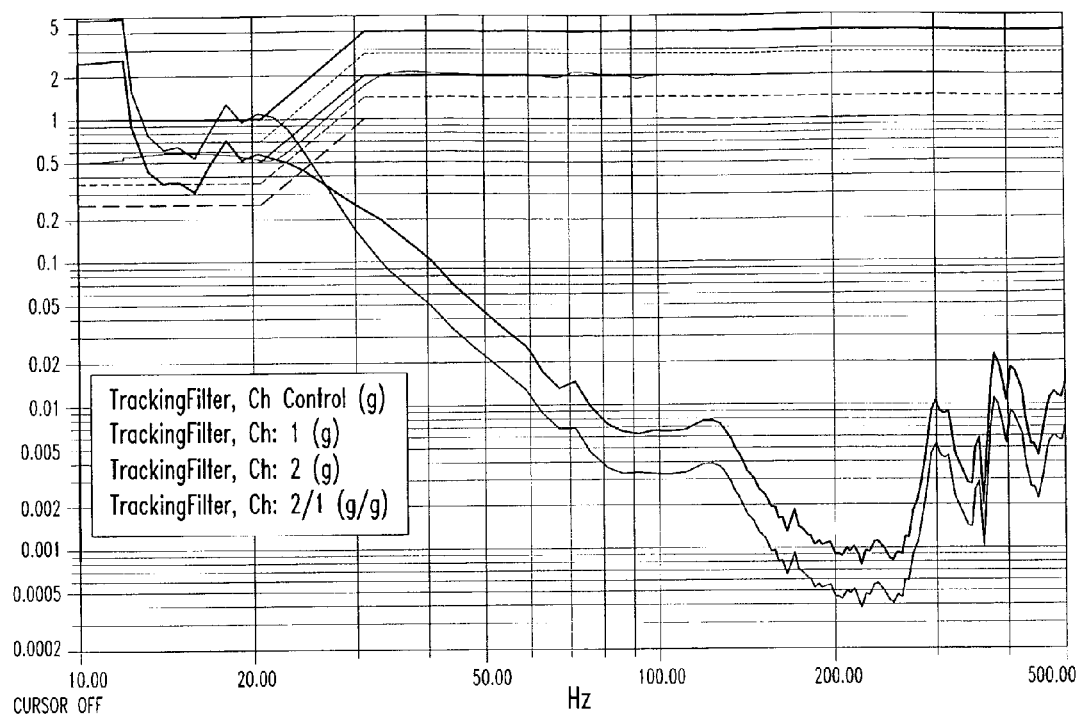
FIG. 4 is a typical performance plot for the shock and vibration assembly.

A common method of vibration suspension performance evaluation is the "Swept Sine" method. This method is employed if the product under test is often subjected to vibrations of relatively sustained frequency and known amplitude. The "Swept Sine" method is a good predictor for the evaluation of the performance of a suspension system in the mobile product environment described herein. FIG. 4 is a typical performance plot of the vibration suspension system described herein using the "Swept Sine" method. Note that the vibration amplitude has been reduced to less than 10% from 35 Hz through 500 Hz.

Although the four springs 16 are described as suspending the computer hard drive 14, they may instead suspend a frame capable of holding the computer hard drive 14. In this case, the dampers 18 are affixed to the frame and not to the computer hard drive 14. This assembly allows for replacement of the computer hard drive 14 without disassembly of the entire system.

Although a computer hard drive 14 is described as the isolated mass in the above-description, any mechanically sensitive electronic device, or any other object, may be suspended from the four springs 16 or from a frame as described above. Further, although the number of springs 16 is described as four, the number of springs 16 required to create the low frequency resonant system will depend on the spring rate of the springs 16, as well as the mass, center of mass, and the shape of the object to be suspended.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to the description. It is therefore contemplated that the appended claims will cover any such modifications or embodiments as fall within the true scope of the invention.

What is claimed is:

1. An assembly for isolating an object from shock and vibration from an external source, comprising;
   (a) a cage surrounding said object, said cage operative to limit displacement of said object;
   (b) a plurality of springs coupled between said object and said cage, said plurality of springs operative to suspend said object from within said cage and to minimize mechanical coupling from said external source to said object, said springs being selected to set the resonant frequency of the assembly to a low spectral energy location; and
   (c) a plurality of dampers affixed to one of said cage and said object and dimensioned to be spaced away from another of said cage and said object in the presence of low amplitude vibration, said dampers shaped with a cross section that increases along their length from their distal end to their proximal end, and comprising a highly energy-absorbing material and operative to dissipate mechanical energy of said object with a progressively increasing deceleration following contact by said object or said cage, respectively, with one or more of said dampers;
   wherein said object is mechanically uncoupled from vibrations outside the system resonant frequency.

2. The assembly according to claim 1, wherein said dampers are mounted along three orthogonal axes.

3. The assembly according to claim 1, wherein said object is a computer hard drive.

4. The assembly according to claim 1, wherein said dampers are tapered.

5. The assembly according to claim 1, wherein said dampers are mounted on said object.

6. The assembly according to claim 1, wherein said dampers are mounted on said cage and are positioned to contact said object when moving excessively in response to impact or vibration.

7. An assembly for isolating an object from shock and vibration from an external source, comprising;
   (a) a cage surrounding said object, said cage operative to limit displacement of said object;
   (b) a plurality of springs coupled between said object and said cage, said plurality of springs operative to suspend said object within said cage and to minimize mechanical coupling from said external source to said object; and
   (c) a plurality of dampers affixed to said object, said dampers made of a highly energy-absorbing material and operative to progressively dissipate mechanical energy of said object with a deceleration that increases exponentially with distance after initial contact between said dampers and said cage which results when said object undergoes excessive displacement;
   wherein said object is mechanically uncoupled from vibrations outside the system resonant frequency.

8. The assembly according to claim 7, wherein said object is a mechanically sensitive electronic component.

9. The assembly according to claim 7, wherein said object is a computer hard drive.

10. The assembly according to claim 7, wherein said dampers are mounted along three orthogonal axes.

11. The assembly according to claim 1, wherein said springs being selected to highly under dampen the suspended object.

* * * * *